(12) United States Patent
Oyamada (10) Patent No.: US 9,057,603 B2
(45) Date of Patent: Jun. 16, 2015

(54) OPTICAL FIBER CURVATURE MEASURING METHOD

(71) Applicant: Shin-Etsu Chemical Co., Ltd., Tokyo (JP)

(72) Inventor: Hiroshi Oyamada, Gunma (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 25 days.

(21) Appl. No.: 13/656,759

(22) Filed: Oct. 22, 2012

(65) Prior Publication Data

US 2013/0100440 A1 Apr. 25, 2013

(30) Foreign Application Priority Data

Oct. 24, 2011 (JP) ................. 2011-233156

(51) Int. Cl.
*G01N 21/00* (2006.01)
*G01B 11/255* (2006.01)
*G01M 11/08* (2006.01)

(52) U.S. Cl.
CPC ........... *G01B 11/255* (2013.01); *G01M 11/088* (2013.01)

(58) Field of Classification Search
CPC .......................... G01B 11/255; G01M 11/088
USPC .................... 356/73.1, 613; 385/136
See application file for complete search history.

(56) References Cited

U.S. PATENT DOCUMENTS 5,067,817 A * 11/1991 Glenn ........................... 356/613
6,052,505 A * 4/2000 Bice et al. ..................... 385/136

FOREIGN PATENT DOCUMENTS

EP 1026475 A1 8/2000

OTHER PUBLICATIONS

International Standard IEC 60793-2-50, Edition 3.0 May 2008: "Optical fibres—Part 2-50: Product specifications—Sectional specification for class B single-mode fibres".
International Standard IEC 60793-1-34, Second Edition, Mar. 2006: "Optical fibres—Part 1-34: Measurement methods and test procedures—Fibre curl".
Preliminary Notice of First Office Action for Patent Application No. 201210407545.5, issued by the Chinese Intellectual Property Office on Nov. 28, 2014.

* cited by examiner

*Primary Examiner* — Tarifur Chowdhury
*Assistant Examiner* — Jamil Ahmed (57) ABSTRACT

An optical fiber curvature measuring method comprising rotatably holding an end of the optical fiber, irradiating two points at a prescribed distance from each other on a side surface of the fiber with a pair of parallel light beams orthogonal to an axial direction, measuring representative positions of scattered and reflected light beams scattered by the side surface as coordinate positions on an axis parallel to the optical fiber axis, calculating a difference between the two coordinate positions, rotating the fiber by a prescribed angle, repeating the calculation of the difference a plurality of times, calculating a positive representative value for amplitude $S_A$ from the difference obtained at each angle, calculating curvature from the amplitude $S_A$ as a first curvature of a first optical fiber longitudinal position, changing positions of the beams irradiating the fiber in the longitudinal direction, and calculating first to m-th curvatures by repeating this process.

12 Claims, 10 Drawing Sheets

OPTICAL FIBER CURVATURE MEASURING METHOD

The contents of the following Japanese patent application are incorporated herein by reference:
No. 2011-233156 filed on Oct. 24, 2011.

BACKGROUND

1. Technical Field

The present invention relates to a method for measuring curvature of an optical fiber.

2. Related Art

When laying optical fibers for communication, the optical fibers can be connected by a fusion splicer. When the connected optical fibers are bent, the axial cores of a portion held in a V-groove and a tip of a portion held at one end can become skewed, and this increases loss at the spliced region.

Therefore, the curvature radius of an optical fiber is set to be 2 meters or more, and the curvature radius of ribbon cable, which is easily affected by curvature, is set to be 4 meters or more (Non-Patent Document 1). Methods for measuring the curvature or curvature radius of an optical fiber include side view microscopy and laser beam scattering, for example (Non-Patent Document 2).

Non-Patent Document 1: IEC 60793-2-50, Edition 3.0 2008-05, Optical fibres—Part 2—50: Product specifications—Sectional specification for class B single mode fibres Non-Patent Document 2: IEC 60793-1-34, Optical fibres—Part 1—34: Measurement methods and test procedures—Fibre curl.

However, when repeating the curvature measurement of the optical fiber, there is a large variation for the curvature in the longitudinal direction.

SUMMARY

Therefore, according to an embodiment of the present invention, provided is An optical fiber curvature measuring method, comprising fixing of inserting one end of the optical fiber into a ferrule, exposing a segment under measurement that includes a tip of the optical fiber from the ferrule, setting the segment under measurement to be an optical fiber under measurement, and holding and fixing the end of the optical fiber on the side of the ferrule opposite the optical fiber under measurement with a rotating holder that rotates the optical fiber under measurement around an axial core of the optical fiber under measurement; by irradiating a side surface of the optical fiber under measurement at one of a plurality of measurement positions included on the segment under measurement with a pair of parallel light beams substantially orthogonal to an axial direction of the optical fiber under measurement and separated from each other by a distance $\Delta z$ in the axial direction, measuring a difference $d_i$ between positions where the pair of light beams reflected by the optical fiber under measurement pass, on a coordinate axis substantially parallel to the axial direction and distanced from the optical fiber under measurement; rotating the optical fiber under measurement with the rotating holder until an angle $\theta_i$; first repeating of repeating the measurement and the rotating, until i values of the difference $d_i$ are obtained; first calculating of calculating, using Expression 1 shown below, a representative value of amplitude $S_A$ from the i values of the difference $d_i$ acquired from the first repeating; second calculating of calculating, using Expression 2 shown below, curvature k of the optical fiber under measurement from the amplitude $S_A$ calculated in the first calculating; moving the positions irradiated by the pair of light beams to another one of the plurality of measuring positions; and second repeating of repeating the moving, the first repeating, the first calculating, and the second calculating m times. Here, i is a natural number equal to 2 or more, Expression 1 is $d_i = S_A \times \cos(\theta_i - \phi) + \Delta z$, $\phi$ represents a phase angle, Expression 2 is $k = S_A/(2L\Delta z)$, and L represents distance between the optical fiber under measurement and the coordinates.

DESCRIPTION OF EXEMPLARY EMBODIMENTS

Figure 1:
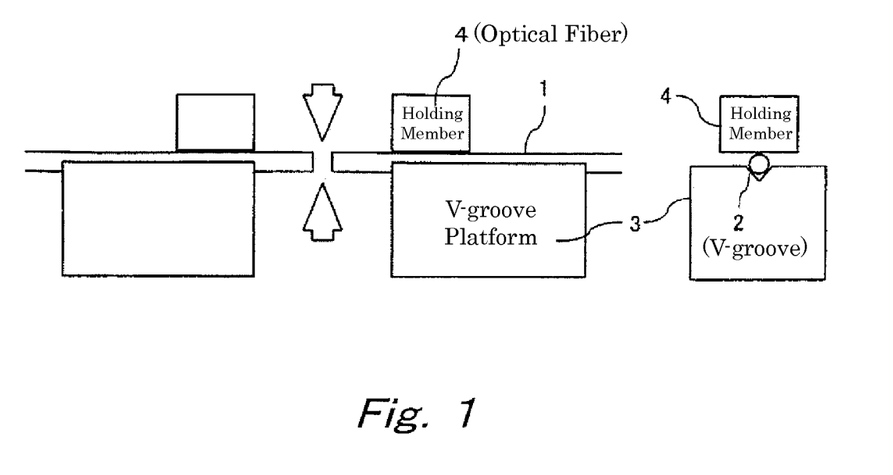
FIG. 1 is a schematic view for describing splicing of optical fibers.

FIG. 1 shows connection of an optical fiber 1 using a fusion splicer. Reference numeral 3 indicates V-groove platforms and reference numeral 4 indicates holding members. Two optical fibers 1 are held in V-grooves 2 near the ends to be spliced, and the ends of the optical fibers 1 are fused by arc discharge.

When one of the optical fibers 1 being fused is bent with a certain curvature, the tip of the optical fiber 1 held at one end by the V-groove 2 shifts from the line along which the V-groove 2 extends, which causes a skew between the cores of the two optical fibers 1 at the ends being spliced, thereby resulting in a poorer connection. Therefore, when splicing the optical fibers 1, the curvature or curvature radius of the optical fibers is measured with high precision.

Figure 2:
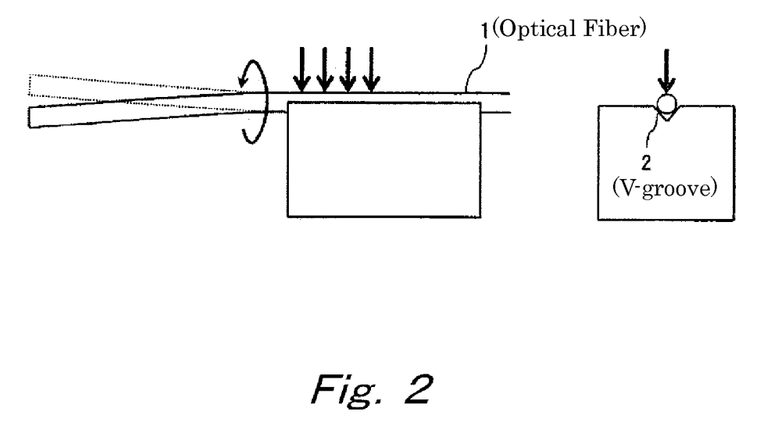
FIG. 2 describes the optical fiber curvature measurement method.

FIG. 2 shows a method referred to as "side view microscopy" for measuring the curvature of an optical fiber 1. With this method, as shown in FIG. 2, a portion of the optical fiber 1 is tentatively fixed to the V-groove 2 using a vacuum chuck, for example, and with the optical fiber 1 being held on one end while a prescribed length thereof protrudes forward, the optical fiber 1 is rotated on its axis. At this time, measurement is performed based on change in the curvature of the protruding portion of the optical fiber 1 and in the amplitude of the movement at the tip according to the length of the protruding portion.

The movement amplitude of the tip is measured with a microscope, and the curvature is calculated while assuming that the curvature of the portion protruding from the V-groove platform 3 is the same over the entire length. With this method, the measuring apparatus has a simple configuration, but the optical fiber 1 is rotated while in contact with the V-groove 2, and therefore the flatness and cleanliness of the surface of the optical fiber 1 contacting the surface of the V-groove 2 has an impact on measurement error. Furthermore, by forming the protruding portion to be suitably long, the measurement accuracy of the movement amplitude is increased, but the optical fiber 1 is more affected by bending under its own weight.

Figure 3:
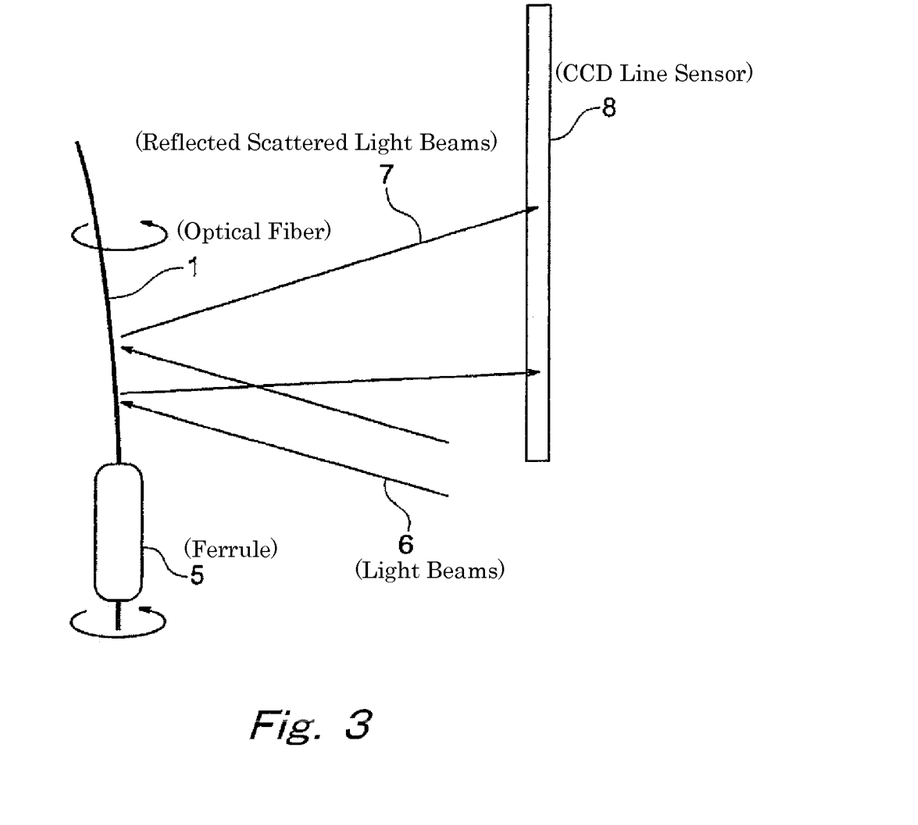
FIG. 3 describes the optical fiber curvature measurement method.

FIG. 3 shows a method referred to as "laser beam scattering" for measuring the curvature of the optical fiber 1. With this method, as shown in FIG. 3, the side surface of the optical fiber 1 protruding through a ferrule 5 is hit with two parallel light beams 6, and the spread in the axial direction of the reflected scattered light beams 7 is observed using a screen such as a CCD line sensor 8.

When the optical fiber 1 is rotated on its axis, the maximum amplitude of the spread is determined according to the curvature of the optical fiber 1, and this fact is used to measure the curvature of the segment hit by the two light beams 6. Here, the ferrule 5 is a support member that holds the optical fiber 1 substantially perpendicular to the light beams 6 and has relatively loose restrictions with respect to flatness, for example, and therefore the measurement has relatively high accuracy.

Figure 4:
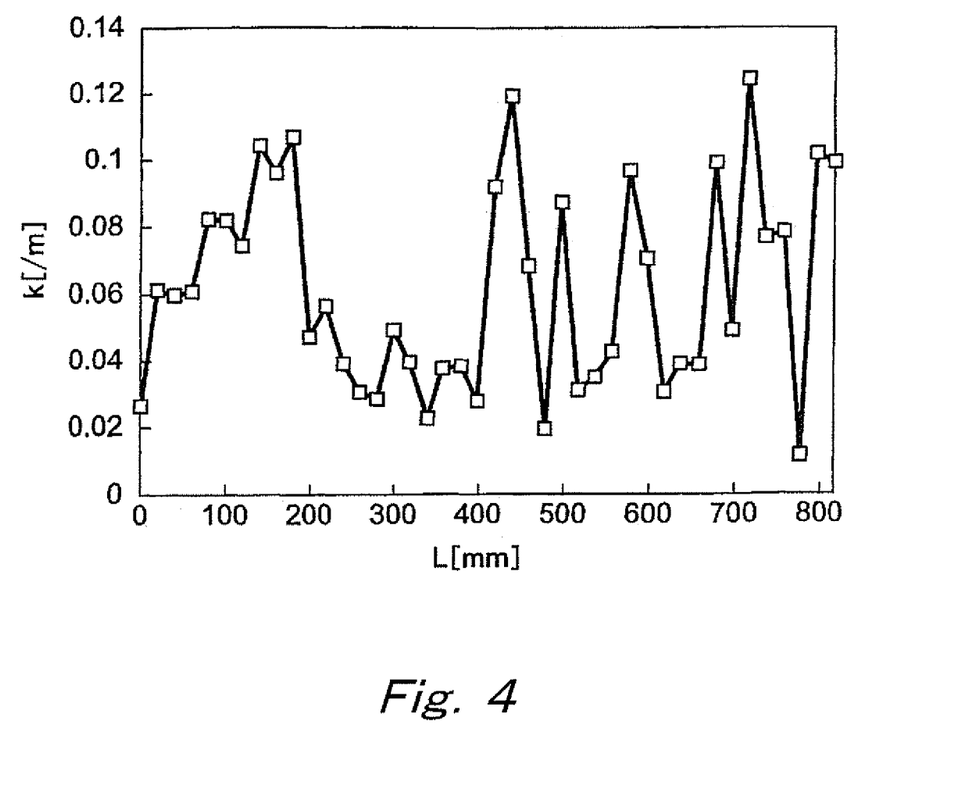
FIG. 4 is a graph showing the curvature k[/m] of an optical fiber measured along the longitudinal direction.

FIG. 4 shows an example in which curvature k[/m] of a commercial optical fiber is measured in the longitudinal direction. This measurement was performed using a commercial laser beam scattering measuring device (FB-240 manufactured by Takikawa Engineering). The optical fiber was inserted into the measuring device while being cut into 2-cm portions, and measurement was performed repeatedly. Based on FIG. 4, it is understood that the curvature of this optical fiber is always 0.065±0.04 to 0.05/m, and that the period of change varies from 50 to 400 mm segments.

In this way, in order to accurately evaluate the curvature of the optical fiber, the curvature must be repeatedly measured for each small segment of the optical fiber in the longitudinal direction. The operation of measuring the curvature change of each several-hundred-millimeter segment while cutting the optical fiber must be performed by hand, and measuring a single fiber can take one hour or more. Therefore, in order to accurately measure the curvature of the optical fiber, a long operation time is required.

The above method for measuring the curvature of the optical fiber includes removing about 40 to 50 mm of coating from an end of the optical fiber, inserting this portion into the measuring device as the optical fiber under measurement, observing the width (difference) d of scattered light beams on a screen while manually rotating the optical fiber on its axis, and using peak-hold to calculate the value S (=d−Δz) at which the amplitude has the maximum value $S_{max}$ based on the interval Δz between the two parallel light beams.

According to one embodiment, in a method for measuring curvature of an optical fiber, one end of the optical fiber under measurement is inserted into a ferrule (a cylinder in which is formed a hole slightly larger than the diameter of the optical fiber) and the exposed portion is set as the optical fiber under measurement. The optical fiber is supported by a rotating holder on the side of the ferrule opposite the optical fiber under measurement. The rotating holder can rotate the optical fiber under measurement around the axial core of the optical fiber.

Next, two points on the axial side surface of the optical fiber under measurement separated from each other by a prescribed distance are irradiated respectively with two light beams that are parallel to each other, from a direction perpendicular to the axial direction. The two radiated light beams are reflected by the side surface of the optical fiber under measurement, and the scattered reflected light of each light beam is detected on a screen arranged at a distance from the optical fiber, for example.

In this way, representative positions for each of the two beams of scattered reflected light from the light beams are measured as positions on a coordinate axis parallel to the axial direction of the optical fiber under measurement, and the difference d between the two obtained coordinate locations is calculated. This calculated difference is set as a first difference $d_1$ in a first angular direction.

A CCD line sensor 8, for example, can be used as the screen described above. Furthermore, the two reflected light beams resulting from the two light beams are spread on the screen due to scattering. Accordingly, the positions of the light beams on the screen may be determined by representative values determined according to positions at which the received light intensity is at a maximum or according to central positions within a range in which the received light intensity exceeds a prescribed threshold value set in advance, for example.

Next, the rotating holder rotates the optical fiber under measurement around its axial core, until reaching a predetermined angle θ. The same operation as described above is performed on the rotated optical fiber under measurement, thereby reflecting the two light beams and setting the difference d, which is calculated from the representative positions of the reflected light beams, as a second difference $d_2$ in a second angular direction.

The operation of setting an (i+1)-th difference at an (i+1)-th angular direction for an i-th rotation is repeated n times, until the n-th difference at the n-th angular direction is calculated. For each angle corresponding to these n differences, Expression 1 can be used to calculate the representative value of the amplitude $S_A$ having a positive value. Furthermore, using Expression 2 above, the curvature k of the optical fiber under measurement can be calculated from the amplitude $S_A$.

The phase angle φ used in Expression 1 is also a representative value obtained together with $S_A$ using a fitting technique, and is an angle indicating the direction in which the fiber is physically bent. These representative values may be determined using a least squares approximation algorithm, such that the error between $d_i$ and $S_A \times \cos(\theta_i - \phi)$ is minimized. When there is a singular value among the $d_i$ values due to measurement problems, this value is detected using a preset threshold value, for example, and excluded from the approximation calculation.

By moving the optical fiber under measurement in the axial direction, the positions at which the light beams irradiate the optical fiber under measurement move in the longitudinal direction of the optical fiber under measurement. Then the irradiation with the light beams, the calculation of the difference d, and the rotation of the optical fiber under measurement are repeated, so that the curvature k at different longitudinal positions of the optical fiber under measurement can be calculated. This series of operations from the movement of the optical fiber under measurement to the calculation of the curvature k is repeated m times, and therefore the curvature can be calculated up to the m-th curvature of an m-th longitudinal position of the optical fiber. Furthermore, the representative value of the curvature k of the optical fiber under measurement can be calculated based on the values of the first through m-th curvature k values obtained in this way.

In this way, with the present embodiment described above, the optical fiber under measurement is formed by removing the coating in a range of 200 to 300 mm or greater from the end of the optical fiber, and this optical fiber under measurement is inserted into the measuring device. The relative positions of the ferrule, the two light beams, and the screen are fixed, and the length of the exposed optical fiber inserted into the ferrule may be changed. In this way, the light beams can hit any positions in the longitudinal direction of the optical fiber under measurement, thereby enabling easy measurement of the localized curvature at any location in the longitudinal direction of the optical fiber under measurement.

At each measurement position, a plurality of combinations of the width $d_i$ of the scattered light beams and the rotational angle $\theta_i$ of the rotating holder can be obtained, e.g. four combinations, and the amplitude SA can be calculated using Expression 1 shown above. Here, fitting may be performed using a least squares approximation. As another example, a Fourier transform may be used.

In this way, the measurement error caused by noise of the scattered light beams can be restricted. Furthermore, since the optical fiber under measurement is measured across its length without being cut, the positioning can be performed automatically. Accordingly, the work involved in measuring the curvature of the optical fiber under measurement can be simplified.

According to another embodiment, in a method for measuring curvature of an optical fiber, one end of the optical fiber under measurement is inserted into a ferrule (a cylinder in which is formed a hole slightly larger than the diameter of the optical fiber) and the exposed portion is set as a first optical fiber under measurement. The optical fiber is supported by a rotating holder on the side of the ferrule opposite the optical fiber under measurement. The rotating holder can rotate the optical fiber under measurement around the axial core of the optical fiber.

Next, two points on the axial side surface of the first optical fiber under measurement separated from each other by a prescribed distance are irradiated respectively with two light beams that are parallel to each other, from a direction perpendicular to the axial direction. The two radiated light beams are reflected by the side surface of the first optical fiber under measurement, and the scattered reflected light of each light beam is detected on a screen arranged at a distance from the optical fiber, for example.

In this way, representative positions for each of the two beams of scattered reflected light from the light beams are measured as positions on a coordinate axis parallel to the axial direction of the first optical fiber under measurement, and the difference d between the two obtained coordinate locations is calculated. This calculated difference is set as a first difference $d_1$ in a first angular direction.

A CCD line sensor 8, for example, can be used as the screen described above. Furthermore, the two reflected light beams resulting from the two light beams are spread on the screen sue to scattering. Accordingly, the positions of the light beams on the screen may be determined by representative values determined according to positions at which the received light intensity is at a maximum or according to central positions within a range in which the received light intensity exceeds a prescribed threshold value set in advance, for example.

Next, the rotating holder rotates the first optical fiber under measurement around its axial core, until reaching a predetermined angle $\theta$. The same operation as described above is performed on the rotated first optical fiber under measurement, thereby reflecting the two light beams and setting the difference d, which is calculated from the representative positions of the reflected light beams, as a second difference $d_2$ in a second angular direction.

The operation of setting an (i+1)-th difference at an i+1)-th angular direction for an i-th rotation is repeated n times, until the n-th difference at the n-th angular direction is calculated. For each angle corresponding to these n differences, Expression 1 can be used to calculate the representative value of the amplitude $S_A$ having a positive value. Furthermore, using Expression 2 above, the curvature k of the first optical fiber under measurement can be calculated from the amplitude $S_A$.

The phase angle $\phi$ used in expression one is also a representative value obtained together with $S_A$ using a fitting technique, and is an angle indicating the direction in which the fiber is physically bent. These representative values may be determined using a least squares approximation algorithm, such that the error between $d_i$ and $S_A \times \cos(\theta_i - \phi)$ is minimized. When there is a singular value among the $d_i$ values due to measurement problems, this value is detected using a preset threshold value, for example, and excluded from the approximation calculation.

Next, without changing the position at which the rotating holder holds the optical fiber, a portion of the first optical fiber under measurement exposed from the ferrule is cut off to be shorter than the first optical fiber under measurement, and this portion is set as the second optical fiber under measurement. After this, the curvature for the second optical fiber under measurement is measured with the same method used for the first optical fiber under measurement.

Next, the curvature value of the first optical fiber under measurement at one longitudinal position is adjusted according to the curvature value of the second optical fiber under measurement at the corresponding longitudinal position. In the same manner, each curvature value up to the m-th curvature of the first optical fiber under measurement is sequentially adjusted. Furthermore, the representative value of the curvature k of the first optical fiber under measurement is calculated based on the adjusted curvature values.

In this way, in the present embodiment, after the curvature in the longitudinal direction of a long portion of the optical fiber under measurement has been evaluated, the optical fiber under measurement is cut down into segments of 100 mm or less, for example, the curvature is then evaluated again, and the curvature value of the long optical fiber under measurement is adjusted. As a result, (1) when the curvature of the optical fiber under measurement is large overall or (2) when the portion of the optical fiber under measurement protruding from the ferrule is long, e.g. more than 100 mm, the bending of the optical fiber under measurement under its own weight, which has the effect of causing the calculated curvature to be greater than the actual curvature value, can be restricted.

(First Embodiment)

Figure 5:
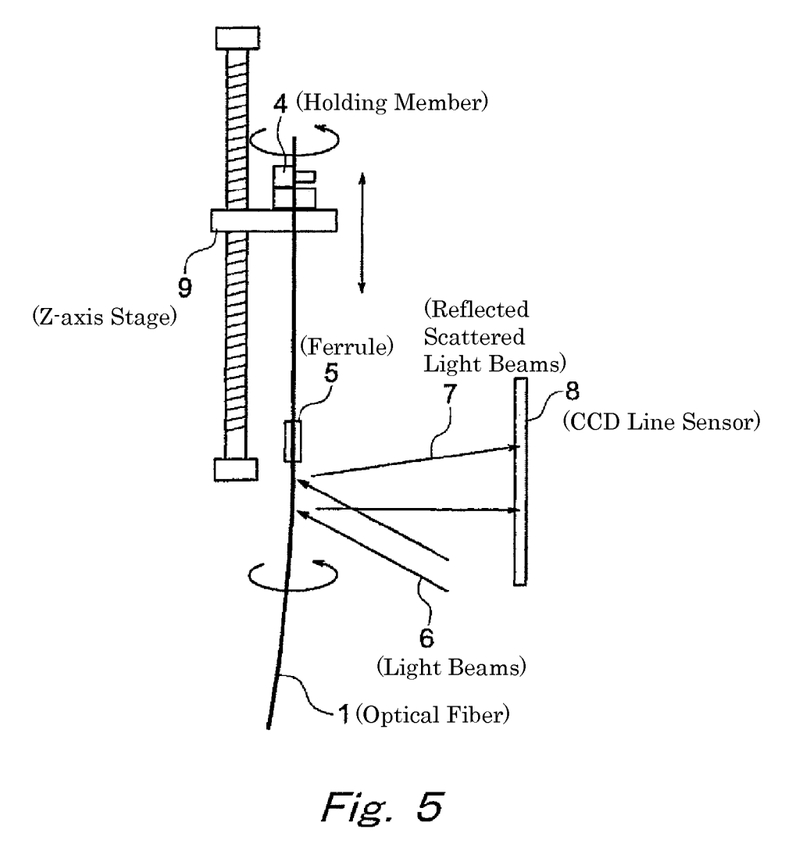
FIG. 5 is a schematic view of a curvature measurement apparatus.

FIG. 5 is a perspective view of an apparatus used when measuring the curvature of the optical fiber 1. One end of the optical fiber 1 is held by the rotating holder 4 and fixed. The other end of the optical fiber 1 is inserted into the ferrule 5. The optical fiber under measurement 1 inserted into the ferrule 5 has the coating removed from the side surface thereof.

The side surface of the optical fiber under measurement is irradiated with two parallel light beams 6, at almost a right angle with respect to a line extending from the hole of the ferrule 5. In other words, the light beams 6 are at almost a right angle with respect to the optical fiber under measurement inserted in the ferrule 5.

The first light beam 6 irradiates a position approximately 5 mm directly below the ferrule 5, and the second light beam 6 irradiates a position approximately 20 mm below the first light beam 6. The scattered light beams scattered by the side surface of the optical fiber under measurement 1 are detected by the CCD line sensor 8 arranged at a distance L=242.8 mm from the optical fiber 1 and parallel to the line extending from the hole of the ferrule.

The positional relationship between the ferrule 5, the parallel light beams 6, and the CCD line sensor 8 is fixed during measurement.

The rotating holder 4 is attached to a Z-axis stage 9 that can move up and down and the optical fiber 1 moves in an axial direction along with the rotating holder 4, such that the amount of the optical fiber protruding from the ferrule 5 is adjustable. In other words, the positions irradiated by the two light beams 6 can be adjusted, and therefore the curvature of the optical fiber can be measured at any position in the longitudinal direction of the optical fiber under measurement.

Here, the optical fiber 1 is held from above and is oriented facing vertically downward. The reason for this is to decrease the effect of the optical fiber under measurement of the optical fiber bending under its own weight.

The total length of the optical fiber is 400 mm, and the length of the optical fiber under measurement from which the coating has been removed is approximately 250 mm. This example shows a case in which the curvature is measured when 50 mm of the optical fiber extends below the end of the ferrule. The second light beam irradiated a position that is approximately 25 mm above the bottom end of the optical fiber, and the first light beam irradiated a position that is approximately 45 mm above the bottom end of the optical fiber.

The optical fiber was rotated around its axis in 10° increments by the rotating holder, and measurement was performed at 37 points between 0° and 360°. The positions of the scattered light beams on the screen were detected at each measurement point, a center point with an intensity that exceeds a suitable threshold value of the scattered light beam of each light beam was set as the representative value for the corresponding scattered light beam position, and the difference in the representative positions of two scattered light beams, i.e. the intervals $d_i$ (1, 2, ..., 37), were measured. The relationship between the angles $\theta_i$ and $d_i$ is shown in Table 1.

TABLE 1

| $\theta$ [°] | $d_i$ [mm] |
|---|---|
| 0° | 19.263 |
| 10° | 19.496 |
| 20° | 19.641 |
| 30° | 19.816 |
| 40° | 19.999 |
| 50° | 20.155 |
| 60° | 20.262 |
| 70° | 20.480 |
| 80° | 20.609 |
| 90° | 20.705 |
| 100° | 20.854 |
| 110° | 20.985 |
| 120° | 20.981 |
| 130° | 21.051 |
| 140° | 21.095 |
| 150° | 21.082 |
| 160° | 21.068 |
| 170° | 21.073 |
| 180° | 20.884 |
| 190° | 20.754 |
| 200° | 20.881 |
| 210° | 20.574 |
| 220° | 20.508 |
| 230° | 20.142 |
| 240° | 19.936 |
| 250° | 19.766 |
| 260° | 19.610 |
| 270° | 19.483 |
| 280° | 19.409 |
| 290° | 19.126 |
| 300° | 19.153 |
| 310° | 19.107 |

TABLE 1-continued

| $\theta$ [°] | $d_i$ [mm] |
|---|---|
| 320° | 19.078 |
| 330° | 19.087 |
| 340° | 19.090 |
| 350° | 19.180 |
| 360° | 19.293 |

Figure 6:
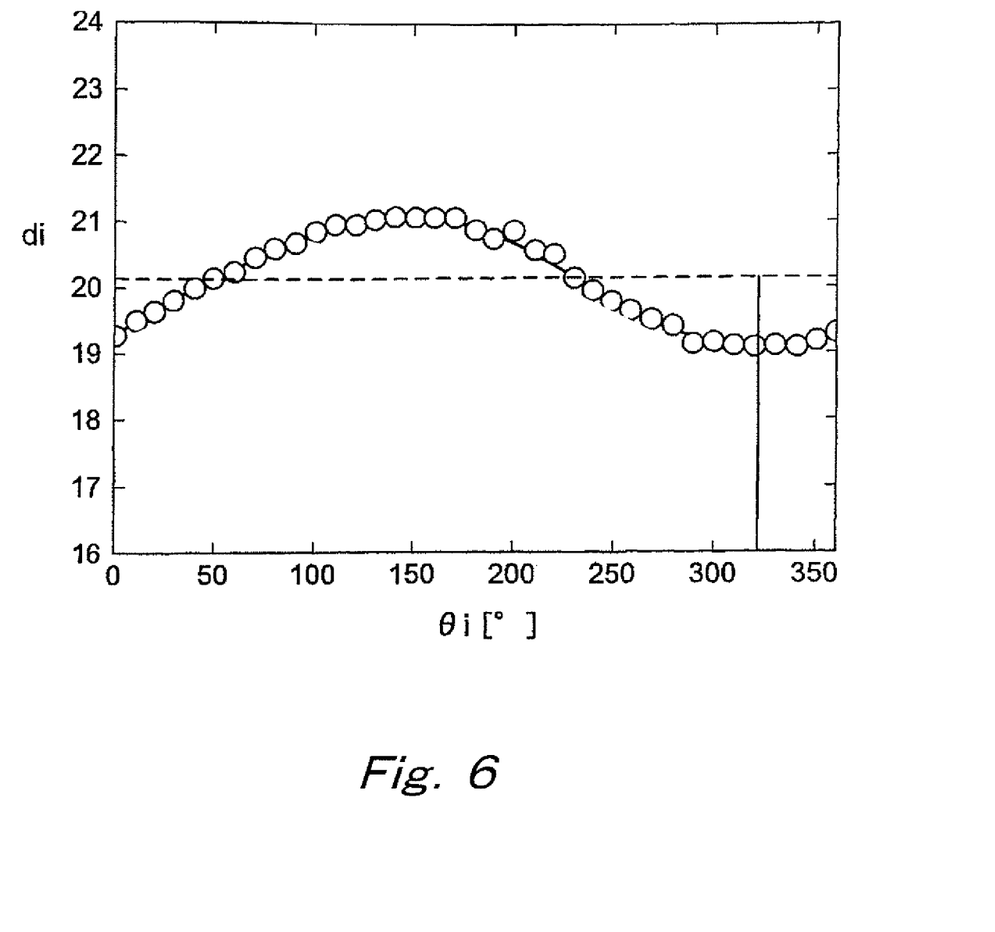
FIG. 6 is a graph showing the relationship between the difference $d_i$ and the angle $\theta_i$.

When these values were input to Expression 1 and the amplitude $S_A$ was calculated using a least squares approximation, the approximation curve shown in FIG. 6 was obtained, indicating the representative values of $S_A$=1.0255 [mm] and $\Delta z$=20.1212 [mm]. Next, the obtained amplitude $S_A$ was input to Expression 2, and the curvature k was calculated to be k=0.1050 [/m]. Expression 3 shown below is then used to calculate the curvature radius r of the optical fiber, based on the curvature k.

$$r = 1/k \qquad \text{Expression 3:}$$

Figure 7:
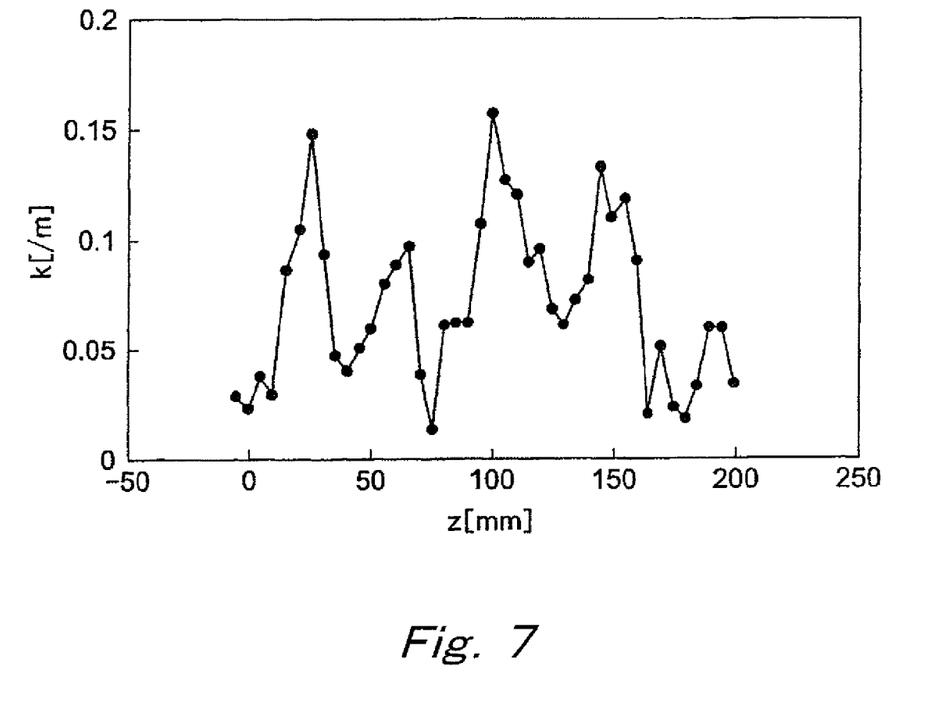
FIG. 7 is a graph showing the relationship between the curvature k and position z for an optical fiber under measurement.

Next, the same measurements were performed while moving the position of the optical fiber under measurement in the longitudinal direction. The measurement results of the curvature in the longitudinal direction are shown in FIG. 7. Based on the measurement values shown in FIG. 7, an average value (median) of the curvature k, which is one type of the representative value $k_a$ of the curvature k, can be calculated to be 0.0622 [mm] Furthermore, based on the representative value $k_a$ of the curvature k, the representative value $r_a$ of the curvature radius r can be calculated to be 16.1 [m], using Expression 4 shown below.

$$r_a = 1/k_a \qquad \text{Expression 4:}$$

(Second Embodiment)

The curvature was measured for an optical fiber differing from the first embodiment. First, approximately 400 mm of an optical fiber was cut off and the covering of a segment of approximately 250 mm thereof was removed to form the optical fiber under measurement. This optical fiber under measurement was fixed in the apparatus shown in FIG. 1.

Figure 8:
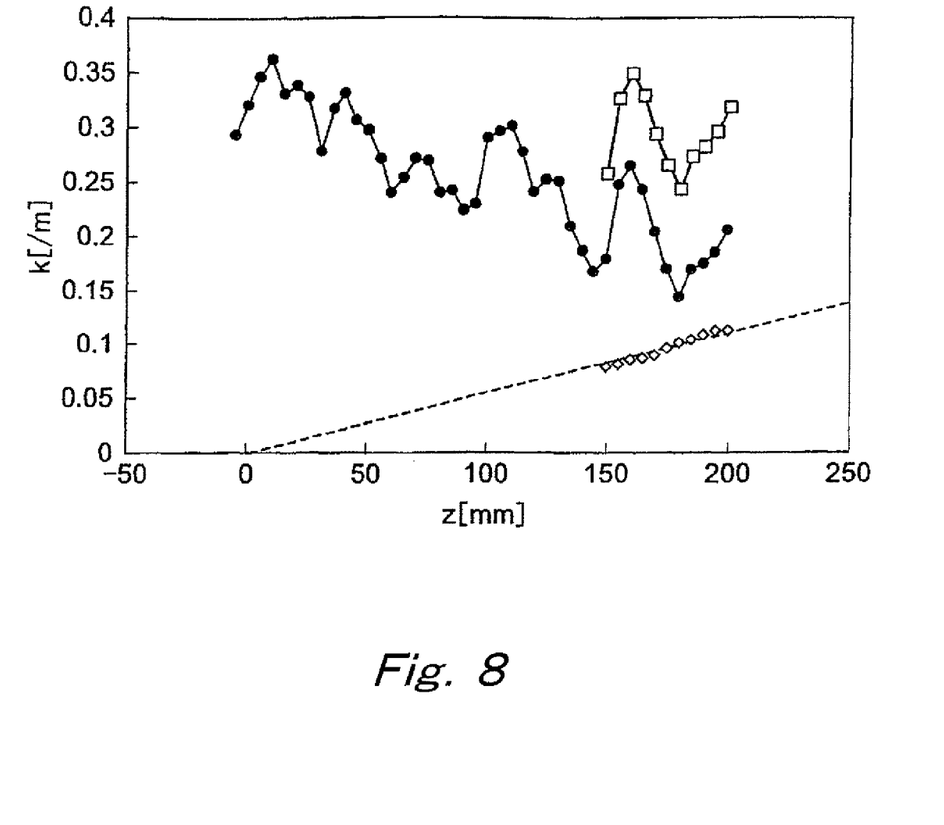
FIG. 8 is a graph showing the relationship between the curvature k and position z for another optical fiber under measurement.

First, the curvature was measured using the same method that was used for the first embodiment. The optical fiber under measurement was fixed to the apparatus and inserted through the ferrule. The measurement results of the curvature in the longitudinal direction for this optical fiber under measurement are shown by the black circles in FIG. 8. The average value (median) of the curvature obtained from these measurements was 0.255 [/m], which corresponds to a curvature radius of 3.92 [m]. However, in the case of an optical fiber with such a large curvature, even if hung vertically, gravity causes the bottom end of the optical fiber under measurement to bend, and the effect of this bending on the measured curvature value cannot be ignored.

Figure 9:
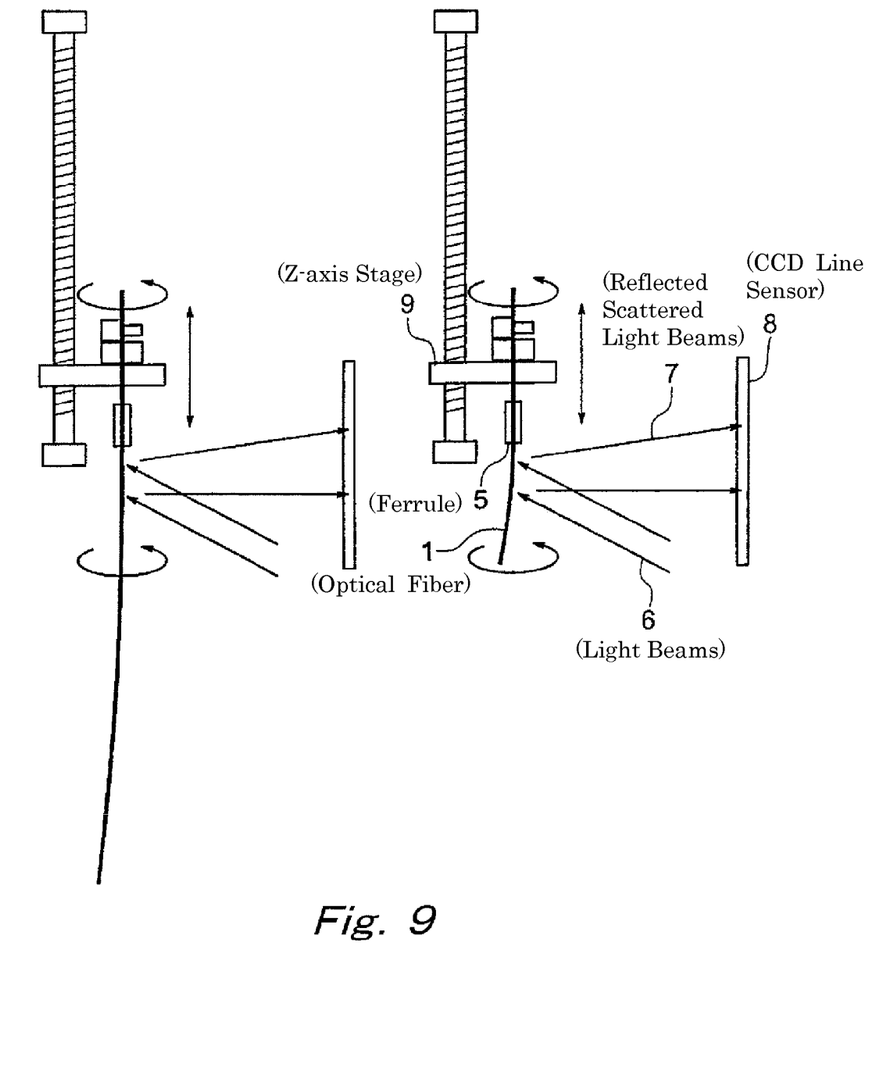
FIG. 9 shows a state in which the bottom end of an optical fiber under measurement is cut off to be shorter.

Therefore, after fixing the optical fiber under measurement in the state shown on the left side of FIG. 9, approximately 150 mm from the bottom end of the same optical fiber was cut off and the curvature measurement was performed again for the resulting shortened optical fiber under measurement, as shown on the right side of FIG. 9. The results of these measurements are shown by the white squares in FIG. 8. It is clear that the curvature value has increased. The results of the evaluation of the difference between the measurement values of the short optical fiber and the measurement values of the long optical fiber are indicated by the white diamond marks in FIG. 8. Fitting was performed using linear approximation, and the result was a straight line with a slope of 0.00055.

Expression 5 shown below was used to correct the curvature measurement values in the longitudinal direction. FIG.

Figure 10:
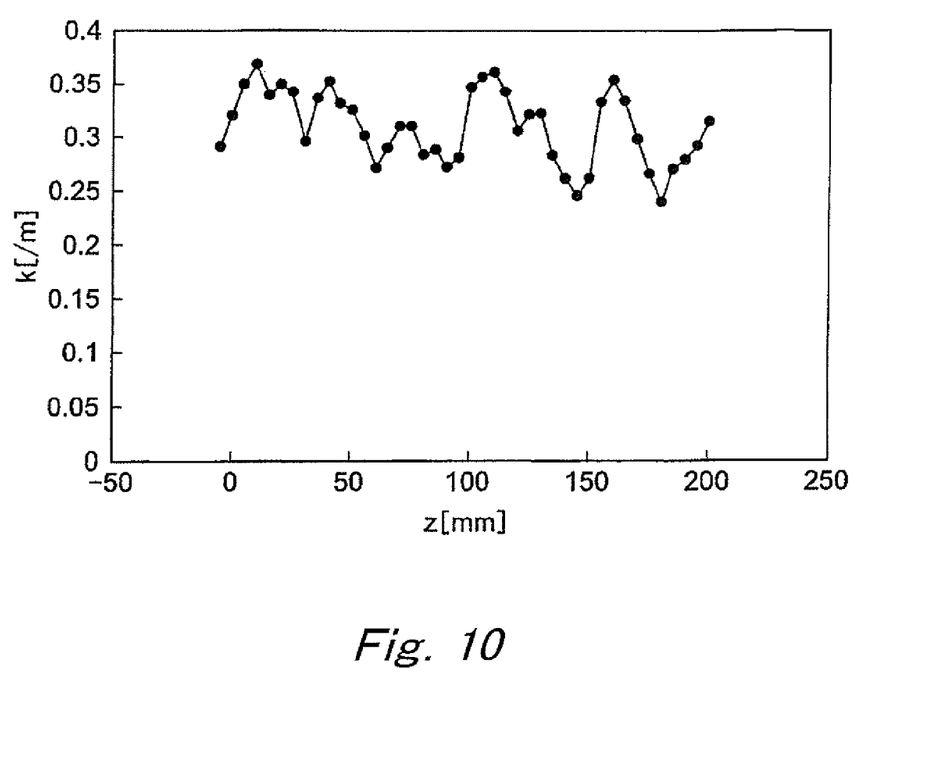
FIG. 10 is a graph showing the relationship between the curvature k and position z for an optical fiber under measurement.

10 shows a distribution of the corrected curvature in the longitudinal direction of the optical fiber.

(corrected curvature)=(curvature for long portion)+ (measured position z)×0.00055    Expression 5:

The average value (median) of the curvature k was calculated to be 0.31184 [/m], and serves as a corrected representative value $k_a$ of the curvature k. Using Expression 4, it was found that this representative value k of the curvature corresponds to a value of 3.21 [m] for the representative value $r_a$ of the curvature radius r of the optical fiber. In this way, using the second embodiment, the curvature can be more accurately evaluated, particularly when the curvature of the optical fiber is large.

What is claimed is:

1. An optical fiber curvature measurement method, comprising:
    inserting a first end of the optical fiber into a ferrule, exposing a segment under measurement that includes a tip of the optical fiber from the ferrule, setting the segment under measurement to be an optical fiber under measurement, and holding and fixing a second end of the optical fiber on the side of the ferrule opposite the optical fiber under measurement with a rotating holder that rotates the optical fiber under measurement around an axial core of the optical fiber under measurement;
    by irradiating a side surface of the optical fiber under measurement at one of a plurality of longitudinal measurement positions included on the segment under measurement with a pair of parallel light beams substantially orthogonal to an axial direction of the optical fiber under measurement and separated from each other by a distance Δz in the axial direction, measuring a difference $d_i$ between positions where the pair of light beams reflected by the optical fiber under measurement pass, on a coordinate axis substantially parallel to the axial direction and distanced from the optical fiber under measurement;
    rotating the optical fiber under measurement with the rotating holder until an angle $\theta_i$;
    first repeating the measurement and the rotating, until i values of the difference d, are obtained;
    first calculating, using Expression 1 shown below, a representative value of amplitude $S_A$ from the i values of the difference $d_i$ acquired from the first repeating;
    second calculating, using Expression 2 shown below, curvature k of the optical fiber under measurement from the amplitude $S_A$ calculated in the first calculating;
    moving the one of the plurality of longitudinal measurement positions of the optical fiber irradiated by the pair of light beams along an axial direction of the optical fiber to another one of the plurality of measuring positions;
    second repeating the moving, the first repeating, the first calculating, and the second calculating m times;
    shortening the optical fiber under measurement by cutting off a portion including the first end of the optical fiber under measurement which includes the tip of the optical fiber under measurement to form a shortened segment under measurement, after performing the processes up to the second repeating;
    after setting a plurality of measurement positions within the shortened segment under measurement from among the plurality of measurement positions to be re-measurement positions, recalculating a plurality of values for each curvature $k_s$ at the plurality of re-measurement positions by performing the first repeating, the first calculating, and the second calculating for each of the re-measurement positions; and
    correcting each of the values for the curvature k calculated for the measurement positions in the segment under measurement, using the values of the curvature $k_s$ calculated in the recalculating for the corresponding re-measurement position among the re-measurement positions in the shortened segment under measurement, wherein i is a natural number equal to 2 or more, is $d_i = S_A \times \cos(\theta_i - \phi) + \Delta z$,    Expression 1

φ represents a phase angle, is $k = S_A/(2L\Delta z)$, and    Expression 2

L represents distance between the optical fiber under measurement and the coordinates.

2. The curvature measurement method according to claim 1, further comprising:
    third calculating a representative value $k_a$ of the curvature k, from the m values of the curvature k obtained from the second repeating.

3. The curvature measurement method according to claim 1, further comprising:
    third calculating a representative value $k_a$ of the curvature k based on n values of the curvature k corrected by the correcting, where n is a natural number and 2≤n≤m.

4. The curvature measurement method according to claim 1, wherein
    the positions where the pair of light beams pass are represented by positions on the coordinate axis at which optical intensity of each light beam is at a maximum value.

5. The curvature measurement method according to claim 1, wherein
    the positions where the pair of light beams pass are represented by central positions on the coordinate axis at which optical intensity of each light beam exceeds a predetermined threshold value.

6. The curvature measurement method according to claim 1, wherein
    the optical fiber under measurement is rotated 180.degree. or more before the first repeating is finished.

7. The curvature measurement method according to claim 1, wherein
    during the first repeating, the rotating and measuring are repeated at least four times.

8. The curvature measurement method according to claim 1, wherein
    during the first calculating, the representative value of the amplitude $S_A$ is calculated using least squares approximation fitting.

9. The curvature measurement method according to claim 1, wherein
    during the first calculating, the representative value of the amplitude $S_A$ is calculated using a Fourier transform.

10. The curvature measurement method according to claim 1, wherein
    during the moving, with the relative positions of the ferrule and the pair of light beams being fixed, the rotating holder and the optical fiber under measurement are moved in the axial direction.

11. The curvature measurement method according to claim 1, further comprising:
    fourth calculating, using Expression 3 shown below, a curvature radius r of the optical fiber under measurement based on the curvature k calculated in the second calculating, wherein is r=1/k    Expression 3.

12. The curvature measurement method according to claim 2, further comprising:

fifth calculating, using Expression 4 shown below, a representative value $r_a$ of a curvature radius r of the optical fiber under measurement based on the representative value $k_a$ calculated in the third calculating, wherein is $r_a = 1/k_a$      Expression 4.

* * * * *